(12) United States Patent
Geisen et al.

(10) Patent No.: US 8,879,521 B2
(45) Date of Patent: Nov. 4, 2014

(54) HANDLING OF TERMINATING CALLS IN A DISTRIBUTED SYSTEM

(75) Inventors: Michael Geisen, Herzogenrath (DE); Frank Uretschlaeger, Herzogenrath (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1197 days.

(21) Appl. No.: 12/520,488

(22) PCT Filed: Dec. 22, 2006

(86) PCT No.: PCT/EP2006/012506
§ 371 (c)(1), (2), (4) Date: Jan. 15, 2010

(87) PCT Pub. No.: WO2008/077428
PCT Pub. Date: Jul. 3, 2008

(65) Prior Publication Data
US 2010/0150119 A1      Jun. 17, 2010

(51) Int. Cl.
*H04W 4/00* (2009.01)

(52) U.S. Cl.
USPC .................. 370/338; 370/400; 455/432.1

(58) Field of Classification Search
None
See application file for complete search history.

(56) References Cited

U.S. PATENT DOCUMENTS

| | | | |
|---|---|---|---|
| 6,636,499 B1 | 10/2003 | Dowling | |
| 2002/0024943 A1* | 2/2002 | Karaul et al. | 370/338 |
| 2004/0018839 A1 | 1/2004 | Andric et al. | |
| 2006/0121916 A1* | 6/2006 | Aborn et al. | 455/456.5 |
| 2008/0280617 A1* | 11/2008 | Aguilar et al. | 455/445 |

FOREIGN PATENT DOCUMENTS

WO    WO 2006/035265 A    4/2006

* cited by examiner

*Primary Examiner* — Mohammad Adhami

(57) ABSTRACT

A technique for handling mobile terminating calls in a distributed switch is described. The switch includes at least one cluster wherein the at least one cluster comprises a plurality of cluster members. Each cluster member is associated with a set of roaming numbers and adapted to route a mobile terminating call to either a recipient subscriber served by the cluster member or to another cluster member which serves the recipient subscriber. The at least one cluster further comprises a first data structure having a content that is common to and accessible by all the cluster members of the cluster. The first data structure specifies the plurality of cluster members and the roaming number set associated with each cluster member.

11 Claims, 5 Drawing Sheets

| MSRN set | Cluster member |
|---|---|
| 49172999991 | Cluster member 1 |
| 49172999992 | Cluster member 2 |
| 49172999993 | Cluster member 3 |
| ... | |

225

| MSRN set | Cluster member | routing address |
|---|---|---|
| 49172999991 | Cluster member 1 | 192.168.52.1 |
| 49172999992 | Cluster member 2 | 192.168.52.2 |
| 49172999993 | Cluster member 3 | 192.168.52.3 |
| ... | | |

HANDLING OF TERMINATING CALLS IN A DISTRIBUTED SYSTEM

FIELD OF THE INVENTION

The invention generally relates to call routing techniques in mobile telecommunication networks. In particular, the invention relates to a technique for routing a mobile terminating call or a handover call to a terminating switch where the recipient subscriber of the call is located in the network.

BACKGROUND OF THE INVENTION

Call routing in a mobile telecommunication network is different from and generally more complicated than that in a fixed telecommunication network. In a fixed network such as a Public Switched Telephone Network (PSTN), a user terminal is permanently connected to a central office, or a central switch. In a mobile telecommunication network on the other hand, a subscriber can roam freely from the service area of one switch to that of another. That is to say, the switch which serves the mobile subscriber—providing switching functions including call routing—may change from time to time.

From the perspective of a calling party who wishes to place a call to a mobile recipient subscriber, a change in the serving switch of the recipient subscriber is invisible. Whether the recipient subscriber is located within the service area of his "home" switch, i.e. the switch at which he registers with the mobile communication network, or is under the service of a different switch, the calling party always dials one and the same telephone number, or directory number, of the recipient subscriber. This number is usually called the Mobile Subscriber ISDN (MSISDN) of the recipient subscriber.

In order to route the call to the recipient subscriber, the switching system of the mobile network internally assigns a number that is different from the MSISDN, a so-called roaming number, to the call and uses this roaming number to determine how to route the call to the terminating switch of the call, that is, to the particular switch which serves the recipient subscriber at the time of the call. The roaming number is often called the Mobile Station Roaming Number (MSRN). MSRNs are related to the geographical numbering plan, and they are not assigned to nor visible to any subscriber. In summary, by means of the MSRN number associated with a mobile terminating call, the switching system of the mobile communication network can route the call to the terminating switch serving the recipient subscriber of the call. A similar mechanism is used for handovers.

With the development of distributed computing, more and more switches in mobile telecommunication networks are being implemented as distributed systems, also called switch clusters. In the language of distributed computing, a "cluster" is a set of loosely coupled computing devices that work together closely so that in many aspects they can be viewed as though they are a single computing device. A cluster usually contains a number of cluster members, or blades. A cluster member is a computing device having all the essential functional components to be considered as a computer while lacking certain features of a stand-alone device for the consideration of space, power, etc.

Applying the cluster paradigm, each switch can be configured as a switch cluster having a plurality of cluster members. That is, a service area which used to be served by one stand-alone switch can now be served by a highly compact switch cluster. The cluster approach provides the benefits of load balancing and high availability, to name a few. For instance, in order to keep the load for each cluster member as even as possible, a distribution mechanism distributes all subscribers served by the service area of the switch cluster over all cluster members.

In principle, each cluster member can perform the switching functionalities just as a conventional stand-alone switch does. For example, each cluster member can handle mobile originating traffic, can receive an incoming call, can route the incoming call to the switch cluster who currently serves the recipient subscriber of the call, and can terminate the incoming call if the recipient subscriber is served by the cluster member itself. Thus, in a distributed switching system with one or more switch clusters wherein each cluster owns a plurality of cluster members, it is necessary for the switching system to determine, for each incoming mobile terminating call, not only the terminating switch cluster but also the very cluster member (in the terminating switch cluster) who serves the recipient subscriber of the call.

Accordingly, there is a need for a technique to efficiently handle mobile terminating calls, and handover calls, in a distributed switching system.

SUMMARY OF THE INVENTION

According to a first aspect of the invention, a switch for a mobile communication network is provided. The switch includes at least one cluster, and the at least one cluster comprises a plurality of cluster members, or blades. Each cluster member is associated with, or "owns", a set of numbers. Further, each cluster member is adapted to either route an incoming call to a recipient subscriber served by the cluster member itself—in other words, to "terminate the call"—or to route the call to another cluster member in the cluster (or, optionally, to a network node outside the cluster); the call routing is based on a number associated with the incoming call. The at least one cluster of the switch further comprises a first data structure which specifies the plurality of the cluster members in the cluster and the number set that is associated with each cluster member. The content of this first data structure is shared by all the cluster members, that is, it is common to all the cluster members and all the cluster members have access to it.

Effectively, all the number sets associated with all the cluster members may be contained in the first data structure. The first data structure may contain further information, such as information specifying a routing address for each cluster member, or for each number set associated with the cluster member. This cluster member routing address may be used by the cluster member receiving the incoming call to route the call either to the recipient subscriber served by the cluster members or to another cluster member. The cluster member routing address may take various formats. One choice of format is the Internet Protocol (IP) address format. Any other conventional address format, such as a point code, is equally applicable.

The switch may further comprise a second data structure. The second data structure defines, with respect to each of the plurality of number sets associated with the cluster members, whether the call routing should be handled within the cluster or by a network node outside the cluster. A network node outside the cluster may be another cluster within the same switch, another switch within the same mobile communication network, or even a cluster or a switch in another network. The network node is not limited to clusters or switches alone; it may be any network node that is equipped with number analysis and call routing functionalities.

The two data structures may be associated, or linked, with each other. There are many ways to create such an association.

As one example, the two data structures may be implemented as two tables in a relational database wherein the two tables are linked with each other by the number sets (since the plurality of number sets are defined in both the first and the second data structure). Another implementation is to merge the information of the two tables into one table. Other implementations known in the art are also possible. The content of the second data structure may be common to all the cluster members in the cluster, and all the cluster members may be provided with access the content.

The first data structure may be stored in a central database of the cluster accessible by each cluster member. Likewise, the second data structure may also be stored in the central database of the cluster. Furthermore, each cluster member may comprise a local copy of at least one of the first and second data structure.

The number associated with the call and used for routing purposes may be a roaming number, for example an MSRN. The number could also be a Handover Number (HON). To minimize administrative efforts, consecutive MSRNs or HONs may be grouped into a series, and one or more MSRN or HON series may be comprised in a number set associated with one cluster member. Of course, the requirement of consecutive numbers in the number set is not a must. In the MSRN or HON scenario, the first data structure may define the owning cluster member of each MSRN or HON number set, and the second data structure may be a routing table for routing incoming calls associated with MSRNs or HONs.

According to another aspect of the invention, a method for handling call routing in a mobile communication network is provided. The mobile communication network comprises a switch including at least one cluster, and the cluster comprises a plurality of cluster members. Each cluster member is associated with a set of numbers and is adapted to route an incoming call to either a recipient subscriber served by the cluster member or to another cluster member. The call routing is handled according to a number associated with the incoming call. The call routing method of the invention comprises the following steps: a first cluster member is provided with access to a content of a first data structure which specifies the plurality of cluster members of the cluster and the number set associated with each cluster member, the content of this first data structure being common to and accessible by all the cluster members in the cluster; the first cluster member receives an incoming call; then, the first cluster member determines, based on the number associated with the call and based on the content of the first data structure, the particular cluster member which currently serves the recipient subscriber of the call.

The method may further comprise routing the call according to the result of the above determination. That is, if it is determined that the first cluster member is the particular cluster member serving the recipient subscriber of the call, the call is routed to the subscriber, or "terminated" at the first cluster member. If it is determined that the recipient subscriber is served by another cluster member, the call is then routed to the other cluster member.

As described above, the first data structure may further specify, with respect to each number set or each cluster member, an associated cluster member routing address. In this case, dependent on the result of the above determination, the first cluster member can determine the routing address via which the call can be further routed. For example, when it is determined that it is a second cluster member who serves the recipient subscriber, the routing address of the second cluster member will be obtained from the content of the first data structure, and the call will be routed to the second cluster member via the corresponding routing address.

As mentioned above, the switch according to the invention may comprise a second data structure which defines, with respect to each of the plurality of number sets associated with all the cluster members, whether the call routing should be handled within the cluster or by a network node outside the cluster. Correspondingly, the method of the invention may further comprise the following steps: the first cluster member, which receives the incoming call, is provided with access to a content of the second data structure; the first cluster member then determines, based on the number associated with the call and the information contained in the second data structure, whether the call should be handled within the cluster or by a network node outside the cluster; and, if it is determined that the call should be handled by a network node outside the cluster, the first cluster member then routes the call to that network node.

According to a further aspect of the invention, a computer program product is provided. The computer program product comprises program code portions for performing the steps of the method of the invention when the computer program product is executed on a switch or a component of a switch. The invention can be practiced by means of hardware, software, or a combined hardware/software approach. As for a software aspect, the computer program product may be stored on a computer-readable recording medium.

BRIEF DESCRIPTION OF THE DRAWINGS

Below, the invention will be described with reference to exemplary embodiments illustrated in the drawings, wherein:

FIG. 4 shows two tables illustrating two respective embodiments of the first data structure of the present invention;

DESCRIPTION OF THE PREFERRED EMBODIMENTS

Figure 1:
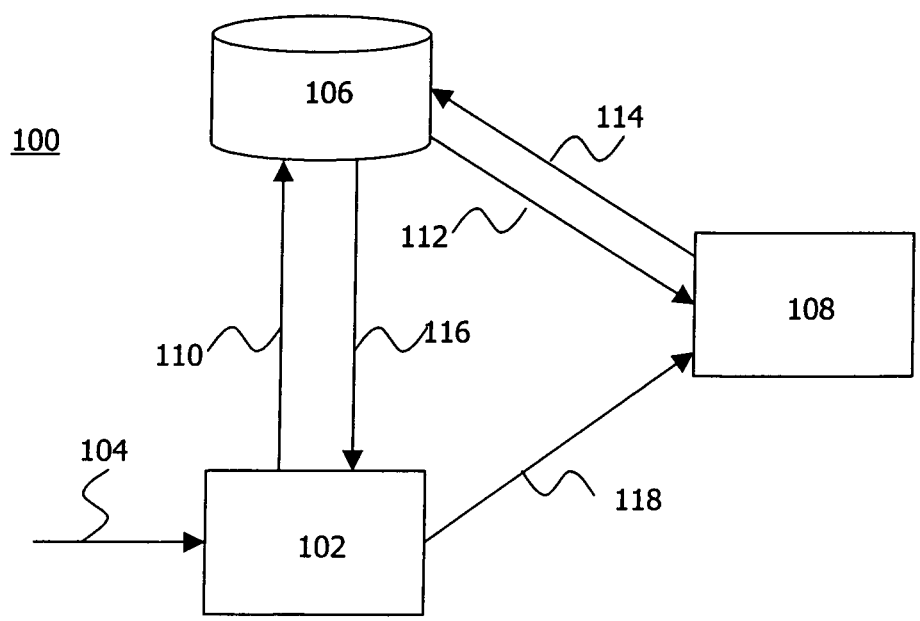
FIG. 1 shows a schematic block diagram illustrating the procedure of HLR interrogation in a conventional switching system.

FIG. 1 illustrates the procedure of Home Location Register (HLR) interrogation in a conventional switching system 100. The basic HLR interrogation procedure shown in FIG. 1 is used in all conventional mobile communication networks for national and international roaming. A similar procedure is used for handovers, wherein the HON is used to route the call to a non-terminating switch. In some implementations the MSRNs can at the same time be used as HONs.

As shown in FIG. 1, the switching system 100 comprises a Gateway Mobile Switching Center (GMSC) 102 through which a mobile terminating call arrives, as indicated by arrow 104. The incoming call is associated with an MSISDN number which has been dialed by the calling party. A GMSC is basically a switch capable of interrogating the subscriber's HLR to obtain routing information, and thus contains a table linking an MSISDN to the corresponding HLR. Although the GMSC function is distinct from a normal Mobile Switching Center (MSC) function, it is usually implemented in an MSC. In the case of a switch cluster, the GMSC function is typically implemented in a cluster member.

The switching system 100 further comprises an HLR 106 which stores the Visitor Location Register (VLR) addresses of terminating nodes. A terminating node is the network node which serves the recipient subscriber of the call. In FIG. 1, this terminating node is an MSC 108. The most general call routing procedure begins with GMSC 102 querying the called subscriber's HLR 106 for an MSRN. Upon receiving the call, GMSC 102 forwards the MSISDN number to HLR 106, as shown by arrow 110. In the HLR 106, the MSISDN number is used to obtain the International Mobile Subscriber Identity (IMSI) of the recipient subscriber as well as the VLR address of the terminating MSC 108. Next, the IMSI is forwarded to the terminating MSC 108, as shown by arrow 112.

At MSC 108, by means of the IMSI, a temporary roaming number, i.e. MSRN, is assigned to the call. MSC 108 owns a pool, or a set, of MSRNs. Thereafter, the assigned MSRN is returned to GMSC 102 via HLR 106, as shown by arrows 114 and 116, respectively. Finally, GMSC 102 uses the MSRN to route the call to MSC 108.

Figure 2:
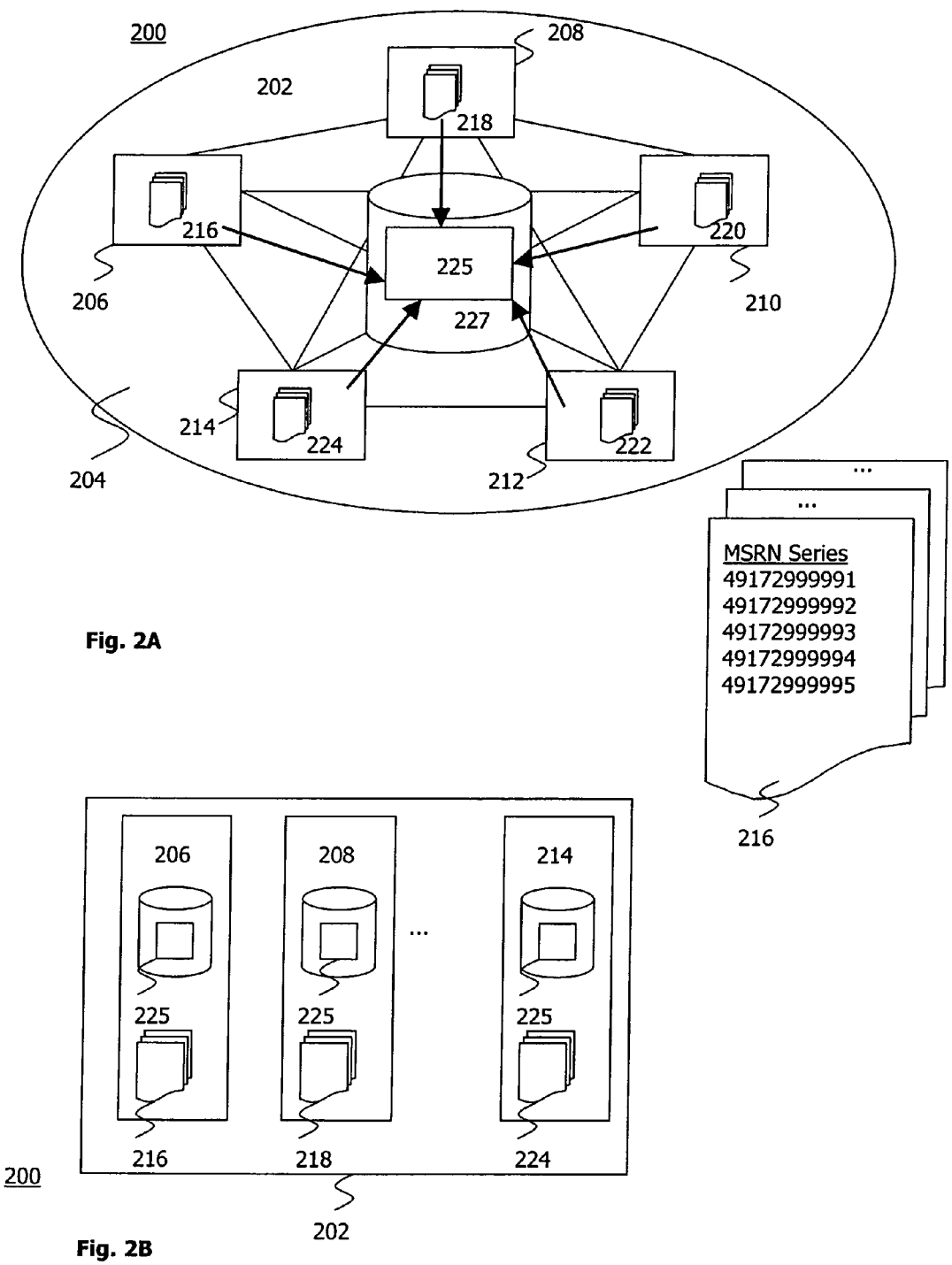
FIG. 2A shows a schematic block diagram illustrating an embodiment of the switch of the present invention.
FIG. 2B shows a schematic block diagram illustrating another embodiment of the switch of the present invention.

FIGS. 2A and 2B illustrate two embodiments of switches for a mobile communication network. The switches may be part of the switching system 100 of FIG. 1 (and incorporate, for example, one or both of GMSC 102 and MSC 108) and participate in the HLR interrogation procedure explained above.

Specifically, FIG. 2A shows a schematic topography of a switch 200. The switch 200 comprises a single switch cluster 202 serving a service area 204. Of course, depending on the hardware and/or software capacity of the switch 200, the number of subscribers served in the service area 204, and/or the volume of the network traffic within the service area 204, the switch 200 may be configured to comprise multiple such clusters.

The cluster 202 comprises a plurality of cluster members, or blades, 206, 208, 210, 212 and 214. Similar as the role of multiple clusters in a switch, multiple cluster members in a cluster provide a further level of load balancing and increased availability. The basic configuration and the functionality of one cluster member is the same as that of another. As shown in FIG. 2A, each cluster member 206, 208, . . . , 214 is associated with a number set 216, 218, . . . , 224, respectively. Each number set, 216 for example, contains roaming numbers such as MSRNs. At HLR interrogation, one MSRN from a certain number set is assigned to the incoming call. As to be explained below, the assigned MSRN number will be used by the cluster 200 to determine how the call will be routed.

Although not absolutely necessary, it is preferable that each number set contains a series of consecutive numbers in association with the respective cluster member. An example of a series of MSRNs is shown in FIG. 2A for the number set 216: 49172999991, 49172999992, 49172999993, 49172999994, and 49172999995. In principle, multiple such MSRN series may be included in the number set 216. The number set associated with a cluster member may be dynamic; that is to say, existing MSRNs or MSRN series in the number set 216 may be deleted or changed, and/or new MSRNs or MSRN series may be added into the number set 216. A dynamic number set is useful for the administration of the entire switch 200 in view of the increase or decrease of the number of subscribers in the service area, increase or decrease in the network traffic, and/or the capacity of the cluster or the cluster members.

The cluster 202 further comprises at least one first data structure 225. The first data structure 225 specifies for the cluster 202 the plurality of cluster members 206, 208, 210, 212, and 214 thereof and the number set associated with each cluster member. More details about the first data structure are to provided in the description of FIG. 4 below.

As FIG. 2A indicates, the first data structure 225 is stored in a central database 227 of the cluster 202. The central database 227 is accessible by each cluster member. Naturally, as can be understood by those skilled in the art, one or more backup copies or mirror copies of the first data structure 225 may be provided in the cluster for the benefit of better performance and/or increased availability.

Alternatively, each cluster member may store or comprise a local copy of the first data structure 225. This case is shown in FIG. 2B, wherein the cluster members 206, 208, and so on each comprise a local copy of the first data structure 225. The provision of local copies is beneficial for a fast and reliable performance of the cluster members 206, 208, 210, 212, and 214.

As figuratively depicted in the two embodiments of FIGS. 2A and 2B, the first data structure 225 (and its content) is in each case common to and accessible by each of the plurality of cluster members 206, 208, 210, 212, and 214. The provision of a common version of the first data structure is advantageous as it facilitates the administration and maintenance of the content of the first data structure (which can become quite voluminous). In other words, it is not necessary to provide each of the cluster members 206, 208, 210, 212, and 214 with an individual version of such a data structure. Rather, a common version of the first data structure 225 is either provided in a centralized manner (FIG. 2A) or in a distributed manner (FIG. 2B) such that the common version is in each case accessible by the various members 206, 208, 210, 212, and 214 of the cluster 202. Accordingly, the first data structure 225 can be administered and maintained centrally and then be loaded either into the central database 227 as shown in FIG. 2A or into the local databases as shown in FIG. 2B. Of course, the embodiments of FIGS. 2A and 2B could be combined in such a manner that the data structure 225 is downloaded from the central database 227 of FIG. 2A to the local databases of FIG. 2B.

Figure 3:
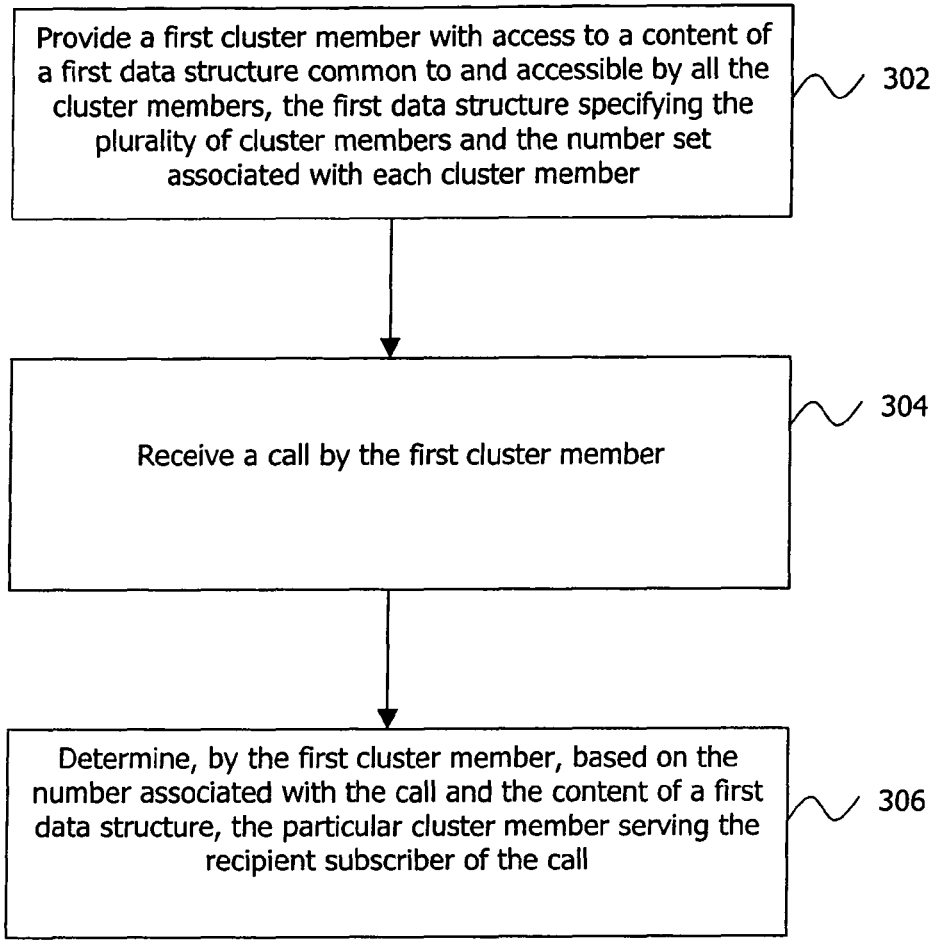
FIG. 3 shows a flow chart illustrating a method embodiment of the present invention.

Next, an embodiment of a call routing method 300 for a mobile communication network will be described in detail with reference to FIG. 3. In order to provide a more thorough understanding, the method 300 will exemplarily be described in relation to the switch 200 of FIGS. 2A and 2B. It should be noted that the method 300 could also be practiced in combination with switches that have a different configuration.

The method 300 begins with providing, at step 302, a first cluster member 206 with access to the first data structure 225, the content of which is common to and accessible by all the cluster members. The first cluster member 206 receives, at a next step 304, an incoming call associated with an MSRN which has been assigned to the call during the HLR interrogation.

The first cluster member 206 may not be the cluster member which serves the recipient subscriber of the call. Thus, at a next step 306, the first cluster member 206 determines the particular cluster member serving the recipient subscriber. The determination is performed based on the MSRN associated with the call and the information contained in the first data structure 225. For instance, the first cluster member 206 examines the MSRN associated with the call, determines the number set which includes this MSRN, looks the number set up in the content of the first data structure 225, and finds the cluster member that is associated with the number set. As mentioned earlier, since the numbers in a number set are preferably in a consecutive order, the first cluster member 206 can efficiently determine to which number set the MSRN associated with the call belongs.

After the first cluster member 206 has determined the serving cluster member of the recipient subscriber, the first cluster member 206 may further route the call, depending on the result of the determination, to either the recipient subscriber or to a second cluster member, 208 for example. In particular, if it has been determined that the first cluster member is the very cluster member which serves the recipient subscriber, the call is then routed to the subscriber. If, on the other hand, it has been determined that a second cluster member 208 is the serving cluster member, the call is then routed to the second cluster member 208 via a connection existent between the two cluster members.

As will be described below, the first data structure may further specify, with respect to each number set or each cluster member contained therein, an associated cluster member routing address. Thus, once the particular cluster member serving the recipient subscriber is determined, the method 300 may continue with the following further steps: the first cluster member 206, knowing the second cluster member 208 is the serving cluster member, can determine the routing address of the second cluster member 208 by looking it up in the first data structure; consequently, the first cluster member 206 can route the call to the second cluster member 208 via the determined routing address.

The method 300 may comprise additional steps. The first cluster member 206 may be provided with access to the content of a second data structure (more details will be provided in the description of FIG. 5 below). In a nutshell, the second data structure defines, with respect to each of a plurality of number sets associated with all the cluster members in the cluster 202, whether the call routing should be handled inside the cluster 202 or outside. By accessing the second data structure (i.e. its content), the first cluster member 206 can determine, based on the MSRN number associated with the incoming call, whether the call should be handled by a cluster member or a network node outside the cluster 202. If it is determined that the call routing should handled by a network node outside the cluster 202, the first cluster member 206 routes the call to that network node accordingly; otherwise, the first cluster member 206 handles the call routing itself.

Preferably, the above additional steps are performed after the first cluster member 206 receives the incoming call, at step 304, and before the first cluster member 206 determines the particular cluster member serving the recipient subscriber, at step 306. In this case, the call routing method 300 is a two-phase procedure. In the first phase, the cluster member receiving the incoming call determines whether the call should be handled inside or outside the cluster; if it is decided that the call should be handled within the cluster, the receiving cluster member continues with the second phase to determine which cluster member within the cluster is serving the recipient subscriber. If the receiving cluster member is actually the serving cluster member of the recipient subscriber, the call is straightforwardly routed to the subscriber; if it is another cluster member within the cluster who is serving the recipient subscriber, the receiving cluster member then routes the call to this serving cluster member.

In FIG. 4, two tables are shown to illustrate two embodiments of the first data structure 225. The upper table shows the basic configuration of the first data structure 225. In this basic configuration, two lists (or columns, or groups) of information are presented. The first list, on the left hand side, is a list of the MSRN number sets (each containing, for example, 10 consecutive MSRNs) associated with the cluster members in the cluster. The second list, on the right hand side, is a list of cluster members, each with an individual identifier 1, 2, 3, and so on. Of course, the identifier may take any format known in the art. As shown in the table, each of the listed MSRN sets is associated with a particular cluster member (namely the member being in the same line of the data structure 225 as the particular MSRN set, thus the MSRN set 49172999991 and cluster member 1 are associated with each other, and so on). By using such a configuration, the first data structure 225 defines all the cluster members within the cluster and the MSRN number sets associated with them. By accessing the information in the first data structure 225, a cluster member is able to determine, based on the MSRN associated with an incoming call, the cluster member who "owns" the corresponding MSRN number set, i.e. the particular cluster member who serves the recipient subscriber of the call.

The lower table in FIG. 4 shows an extended configuration 225' of the first data structure 225. As can be easily seen, the extended first data structure 225 additionally contains a third list, a list of IP routing addresses, corresponding to a MSRN number set and a corresponding cluster member. With the routing address information included in the first data structure 225, the cluster member who receives the call may further route the call to the serving cluster member of the recipient subscriber via the determined routing address (or terminate the call locally if required). In the version shown in FIG. 4, the MSRN set 49172999991 and cluster member 1 are associated with the IP address 192.168.52.1, and so on.

Figure 5:
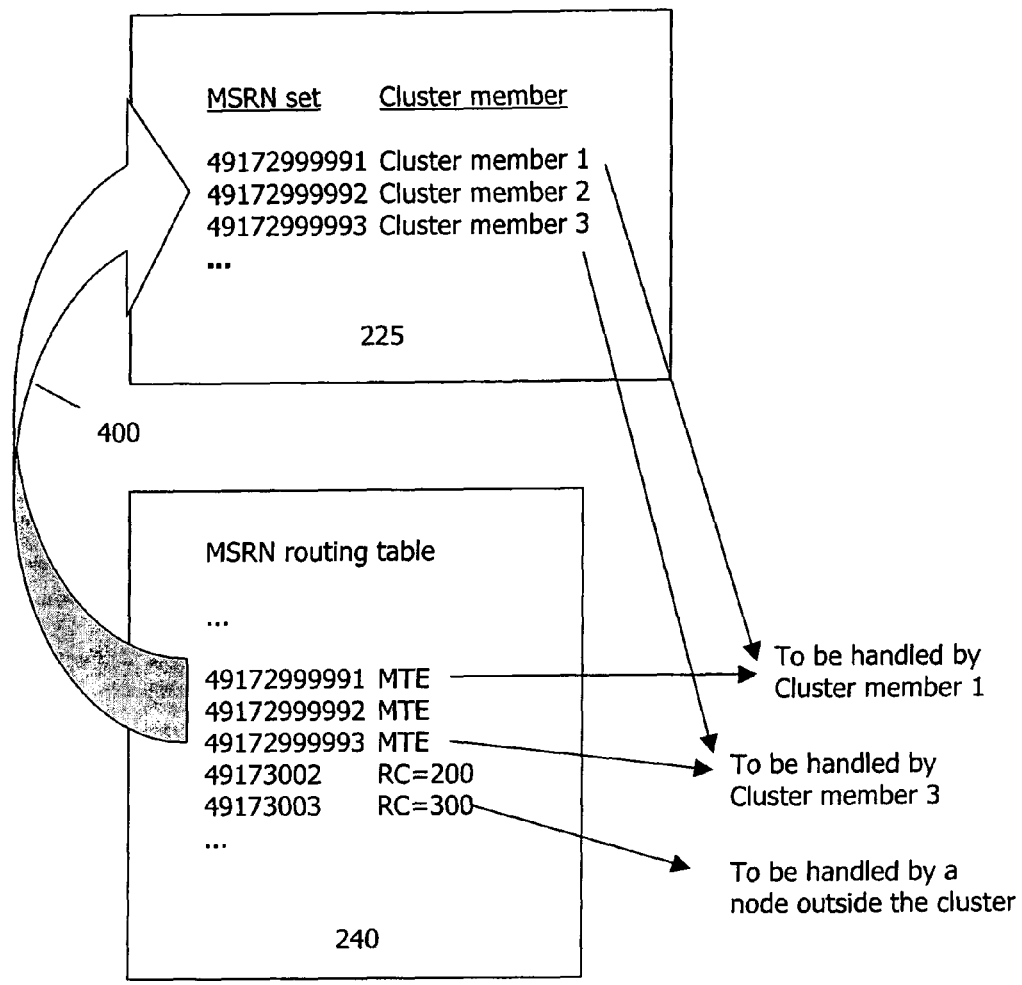
FIG. 5 shows two tables illustrating an embodiment of the first data structure and the second data structure of the present invention.

In FIG. 5, the upper table represents the first data structure 225, and the lower table illustrates an embodiment of a second data structure 240 associated with the first data structure 225. The content of the second data structure 240 is common to and accessible by all the cluster members of the cluster. The second data structure 240 may, for example, be stored in the central cluster database 227 (FIG. 2A) or locally at each cluster member (FIG. 2B).

The second data structure 240 is an MSRN routing table which defines how a mobile terminating call should be routed based on an analysis of the MSRN number associated with the call. The MSRN routing table is also known as the B-number analysis table. As shown in the MSRN routing table of FIG. 5, for each MSRN number set, a route is indicated: a call associated with an MSRN number belonging to one of the number sets 49172999991, -2 and -3 should be handled inside the cluster; a call with an MSRN number falling in the number set of 49173002 should be handled by a network node outside the cluster and so on. In summary, the second data structure 240 determines whether an incoming call should be handled within the cluster or by a network node outside the cluster.

When it is determined, based on the content of the second data structure 240, that an incoming call should be handled within the cluster, then the first data structure 225 is consulted to identify the particular cluster member that is to terminate the call (as indicated by the arrow 400). Since both the first data structure 225 and the second data structure 240 include a list of all the MSRN number sets owned by a cluster, the two data structures are associated, or linked, with each other by means of these number sets.

Although embodiments of the present invention have been illustrated in the accompanying drawings and described in the foregoing description, it should be understood that the invention is not limited to the embodiments disclosed herein. In particular, the invention can also be practiced in (non-terminating) handover scenarios based on a HON that is assigned to a call. Moreover, the invention is capable of numerous rearrangements, modifications, and substitutions without departing from the spirit and scope of the invention as set forth and defined by the following claims.

The invention claimed is:

1. A switch for call routing in a mobile communication network, the switch including a cluster, the cluster comprising:

a plurality of cluster members, each cluster member being arranged to terminate an incoming call to a recipient subscriber served by the cluster member or to route the incoming call to another cluster member, wherein a number is associated with each incoming call, the associated number comprising at least one of a Mobile Subscriber Router Number (MSRN) and a Handover Number (HON), each cluster member having a dynamic set of numbers associated therewith, each of the numbers of the dynamic set of numbers comprising at least one of an MSRN and HON and incoming calls associated with a number from the dynamic set of numbers being terminated at the associated cluster member;

a component arranged to provide a first data structure common to and accessible by all the cluster members, wherein the first data structure specifies each of the cluster members and the dynamic set of numbers associated with each of the cluster members, wherein existing MSRNs and/or HONs in the dynamic set of numbers may be deleted or changed;

a component arranged to receive an incoming call by one of the cluster members; and a component arranged to determine, by the receiving cluster member, the particular cluster member to terminate the incoming call by consulting the first data structure based on the number associated with the received call.

2. The switch of claim 1, wherein the first data structure further specifies, with respect to each dynamic set of numbers or each cluster member, an associated cluster member routing address.

3. The switch of claim 2, wherein the routing address is an Internet Protocol address.

4. The switch of claim 1, further comprising a second data structure defining, with respect to each of a plurality of number sets, whether the call routing should be handed within the cluster or by a network node outside the cluster.

5. The switch of claim 4, wherein the second data structure is associated with the first data structure.

6. The switch of claim 4, wherein a content of the second data structure is common to and accessible by the cluster members.

7. The switch of claim 1, wherein at least one of the first and second data structures is stored in a central cluster database that is accessible by each cluster member.

8. The switch of claim 1, wherein each cluster member comprises and accesses a local copy of at least one of the first and second data structure.

9. A call routing method for a mobile communication network comprising a switch including at least one cluster, the cluster comprising:

a plurality of cluster members, each cluster member being arranged to terminate an incoming call to a recipient subscriber served by the cluster member or to route the incoming call to another cluster member, wherein a number is associated with each incoming call, the associated number comprising at least one of a Mobile Subscriber Routing Number (MSRN) and a Handover Number (HON), wherein each cluster member has a dynamic set of numbers associated therewith, each of the numbers of the dynamic set of the numbers comprising at least one of an MSRN and HON, and an incoming call associated with a number from the dynamic set of numbers is to be terminated at the associated cluster member;

providing a first data structure common to and accessible by all the cluster members, wherein the first data structure specifies each of the cluster members and the dynamic set of numbers associated with each of the cluster members, wherein existing MSRNs and/or HONs in the dynamic set of numbers may be deleted or changed;

receiving an incoming call by one of the cluster members; and determining, by the receiving cluster member, the particular cluster member that is to terminate the incoming call by consulting the first data structure based on the number associated with the received call.

10. The method of claim 9, further comprising the steps of:

the first data structure further specifying, with respect to each dynamic set of numbers or each cluster member, an associated cluster member routing address, determining the routing address of the particular cluster member different from the receiving cluster member; and routing the call to the particular cluster member via the determined routing address.

11. The method of claim 9, further comprising the steps of:

providing the receiving cluster member with access to a content of a second data structure defining, with respect to each of a plurality of number sets, whether the call routing should be bandied within the cluster or by a network node outside the cluster;

determining, based on the number associated with the call and the content of the second data structure, if the call should be handled by a network node outside the cluster; and routing the ca to the network node dependent on the result of the determination.

* * * * *

UNITED STATES PATENT AND TRADEMARK OFFICE
CERTIFICATE OF CORRECTION

Page 1 of 1

PATENT NO. : 8,879,521 B2
APPLICATION NO. : 12/520488
DATED : November 4, 2014
INVENTOR(S) : Geisen et al.

It is certified that error appears in the above-identified patent and that said Letters Patent is hereby corrected as shown below:

In the specification

In Column 4, Line 49, delete "DESCRIPTION" and insert -- DETAILED DESCRIPTION --, therefor.

In Column 6, Lines 5-6, delete "to provided" and insert -- to be provided --, therefor.

In Column 8, Line 21, delete "225" and insert -- 225' --, therefor.

In the claims

In Column 9, Line 42, in Claim 4, delete "handed" and insert -- handled --, therefor.

In Column 10, Line 45, in Claim 11, delete "bandied" and insert -- handled --, therefor.

In Column 10, Line 51, in Claim 11, delete "ca" and insert -- call --, therefor.

Signed and Sealed this
Fifth Day of April, 2016

Michelle K. Lee
*Director of the United States Patent and Trademark Office*